May 18, 1926.
A. MARCHAND
NUT LOCK
Filed Sept. 30, 1925
1,585,595
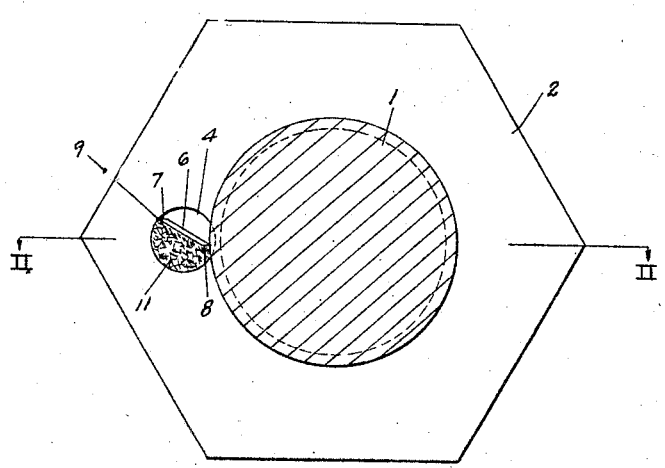
Fig. I
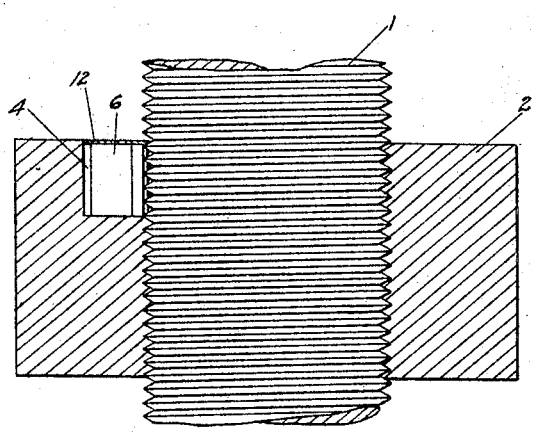
Fig. II
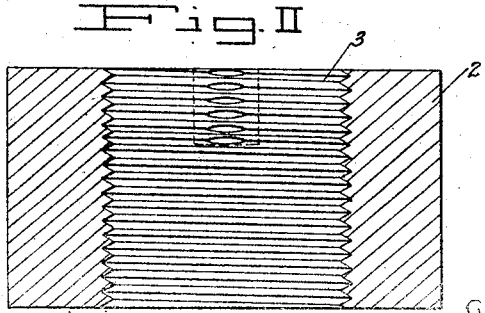
Fig. III
Inventor
Alexis Marchand
By
Atkins & Atkins
Attorneys Patented May 18, 1926.

1,585,595

UNITED STATES PATENT OFFICE.

ALEXIS MARCHAND, OF SEATTLE, WASHINGTON, ASSIGNOR TO PAUL D. RANGE, TRUSTEE FOR SECURITIES SALES SYNDICATE.

NUT LOCK.

Application filed September 30, 1925. Serial No. 59,617.

My invention has for one of its objects the production of a nut lock in which the locking mechanism is encased and confined in the nut within a cylindrical socket that is so constructed as to cut away each alternate thread of the bore of nut but without cutting through the remaining alternate threads.

By this construction the threads left unsevered are preserved to constitute for the pawl of the locking mechanism within the socket a cage to prevent detachment of the pawl from the nut.

Another object of my invention is to provide on one side of the pawl within the socket aforesaid a suitably compressed cork filling, whose peculiar resiliency may be depended upon to cause the pawl to functionate properly, and whose nature is such as to afford effective resistance to that corrosion by substances such as oils or other liquids, which would practically prohibit the use of metal or of rubber as a substitute for the cork.

Other objects of my invention will appear to one skilled in the art from perusal of the following specification, wherein what constitutes my invention is described in detail and is succinctly defined in the appended claims.

In the accompanying drawing wherein my invention in present preferred form of embodiment is illustrated—

Figure I is an end elevation of a bolt, and, screwed thereon, a nut equipped with my invention.

Figure II is a view partly in section on line II—II of Figure I and partly in elevation.

Figure III is a diametrical section of a nut taken at right angles to that shown in Figure II, with the bolt omitted.

Referring to the numerals on the drawing, 1 indicates a threaded bolt which may be provided with any usual or preferred form of thread, and may be made of any size desired. 2 indicates a nut which may be of any usual or preferred shape and whose bore is furnished with internal threads 3 to suit the threading of the bolt 1.

In the body of the nut is formed, as by boring, a socket 4, whose longitudinal axis is parallel to the bore of the nut. The cylindrical shape of the socket lends itself to economy in manufacture and dependability in use of my nut lock.

The socket 4 is so disposed, in its relationship to the bore of the nut, as to cut away such portions only of the threads 3 as are more remote from the axis of the bore of the nut, leaving the innermost portion of threads 3 unsevered so that they constitute in themselves a cage adapted positively to confine within the socket the mechanical contents thereof. The cut and the unsevered portions, respectively, of the threads 3 as described are disposed in effect in alternate order throughout the longitudinal extent of the socket.

Within the socket, I provide a pawl 6, consisting preferably of a loose, flat plate, which may be made of suitable metal, usually hard steel. The length of the pawl is a little less than that of the socket, and its width is somewhat less than the diameter of the socket. Consequently when set in operative position in the socket the pawl extends in chordal relationship to the cylindrical shape of the socket in a plane at an angle to a plane diametrical to the bore of the nut. The pawl is held in that relationship last specified by sharp edges 7 and 8 provided upon its opposite sides. The edges 7 and 8 are preferably chisel shaped edges, being defined, respectively, by reversely disposed bevel faces as illustrated.

The edge 7 bites the thereto next adjacent wall of the socket, which may be provided with a shallow, angularly shaped groove 9 to insure a distinct knife-edge base-support for the pawl on the wall of the socket. Such knife-edge base-support is not always essential, and in many instances, as for example in small nuts, may be dispensed with to positive advantage.

The edge 8, on the other hand, rests against the open cage wall which is formed by the unsevered portions of the threads 3, aforesaid, by the turns of which the bore of the nut is internally circumscribed, the wall of the socket being provided actually or in effect with a slit that is wide enough to allow sufficient oscillation of the pawl on its edge 7 to permit the nut to turn freely in one direction of its rotation, but to act as a lock, by engagement with the threads of the bolt exposed to its bite, and to hold the nut against rotation in the direction opposite to that just specified. The slit and the groove 9, if used, or otherwise its equivalent line of contact between the wall of the socket 4 and the edge 7, should be in substantially parallel relationship and so disposed to each other and to the wall of the socket in which they are provided, as to effect presentment of the edge 8 of the pawl 6 to the best advantage for its engagement with the bolt threads 4 presented to it through the openings defined by cut away portions of the threads 3.

Within the larger space defined within the socket by the presence therein of the pawl 6, I provide a filling 11 or body of cork, which should be sufficiently compressed to substantially fill said space and also to develop such degree of resiliency as the function required of it demands. The cork not only effectively resists corrosion as aforesaid, but also, when properly compressed, develops a degree of resiliency which will be slow and steady in action instead of the more lively action which a metal spring, for example, would give, thereby eliminating a chattering engagement which might, without provision of the cork filling 11, take place between the pawl 6 and the threads 3.

After the filling 11 is set in place, I prefer to encase it within the socket 4 by a cover-cap 12, which may consist simply of a close fitting metal disc driven into the open end of the socket with press fit.

What I claim is:

1. A nut lock, comprising a nut having an internally threaded bore and a socket, intercepting said bore as described, the longitudinal axes of the bore and socket being substantially parallel, in combination with a yieldingly spring-actuated pawl disposed within the socket and having edges upon its opposite sides, one of said edges engaging a knife-edge base-support provided in the wall of the socket, and the other being, through openings in threads of the nut formed by the intercepting of the socket with the bore of the nut, presented for engagement with the threads of a bolt when screwed into the bore of the nut.

2. A nut lock, comprising a nut having an internally threaded bore and a socket, intercepting said bore as described, the longitudinal axes of the bore and socket being substantially parallel, in combination with a yieldingly spring-actuated pawl disposed within the socket and having reversely disposed chisel shaped edges upon its opposite sides, one of said edges engaging the wall of the socket, and the other being, through openings in threads of the nut formed by the intercepting of the socket with the bore of the nut, presented for engagement with the threads of a bolt when screwed into the bore of the nut.

3. A nut lock, comprising a nut having an internally threaded bore and a socket, intercepting said bore as described, the longitudinal axes of the bore and socket being substantially parallel, in combination with a yieldingly spring-actuated pawl disposed within the socket and having edges upon its opposite sides, one of said edges engaging a knife-edge base-support provided in the wall of the socket, and the other, being through openings in threads of the nut formed by the intercepting of the socket with the bore of the nut, presented for engagement with the threads of a bolt when screwed into the bore of the nut, said base-support being so located in the wall of the socket as to dispose the pawl in a plane at an angle to a plane diametrical to the bore of the nut.

4. A nut lock, comprising a nut having an internally threaded bore and a socket, intercepting said bore as described, the longitudinal axes of the bore and socket being substantially parallel, in combination with a yieldingly spring-actuated pawl disposed within the socket and having edges upon its opposite sides, one of said edges engaging the wall of the socket, and the other being, through openings in threads of the nut formed by the intercepting of the socket with the bore of the nut, presented for engagement with the threads of a bolt when screwed into the bore of the nut, and a filling of cork compressed into the socket against the pawl for actuating the pawl substantially as and for the purpose specified.

5. A nut lock, comprising a nut having an internally threaded bore and a socket, intercepting said bore as described, the longitudinal axes of the bore and socket being substantially parallel, in combination with a yieldingly spring-actuated pawl disposed within the socket and having edges upon its opposite sides, one of said edges engaging the wall of the socket, and the other being, through openings in threads of the nut formed by the intercepting of the socket with the bore of the nut, presented for engagement with the threads of a bolt when screwed into the bore of the nut, a filling of cork compressed into the socket against the pawl for actuating the pawl substantially as and for the purpose specified, and a cover-cap perfecting the encasing of the filling within the socket.

In testimony whereof, I have hereunto set my hand.

ALEXIS MARCHAND.